(12) United States Patent
Lee et al.

(10) Patent No.: US 7,103,031 B2
(45) Date of Patent: Sep. 5, 2006

(54) METHOD OF TRANSMITTING/RECEIVING BROADCAST MESSAGE IN MOBILE COMMUNICATION SYSTEM

(75) Inventors: Young Jo Lee, Kyonggi-do (KR); Jong Hoe An, Kyonggi-do (KR); Woo Seok Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 709 days.

(21) Appl. No.: 09/984,309

(22) Filed: Oct. 29, 2001

(65) Prior Publication Data
US 2002/0051442 A1 May 2, 2002

(30) Foreign Application Priority Data
Oct. 30, 2000 (KR) ............................... 2000-63985

(51) Int. Cl.
*H04J 3/00* (2006.01)
*H04Q 7/20* (2006.01)
*H04B 7/216* (2006.01)
*H04B 7/00* (2006.01)

(52) U.S. Cl. ................. 370/345; 370/342; 370/468; 455/450; 455/509

(58) Field of Classification Search ............... 370/230, 370/310, 329, 330, 331, 335, 337, 342, 347, 370/358, 432, 437, 458, 468, 378, 208, 209; 455/62, 68, 69, 88, 426, 450, 455, 458, 509, 455/515–517
See application file for complete search history.

(56) References Cited

U.S. PATENT DOCUMENTS

| 6,088,578 A * | 7/2000 | Manning et al. ............... 455/68 |
|---|---|---|
| 6,330,436 B1 * | 12/2001 | Zidel ........................ 455/412.2 |
| 6,614,700 B1 * | 9/2003 | Dietrich et al. .............. 365/194 |
| 6,690,655 B1 * | 2/2004 | Miner et al. ................. 370/278 |
| 6,728,300 B1 * | 4/2004 | Sarkar et al. ................ 375/147 |
| 6,741,580 B1 * | 5/2004 | Kim et al. ................... 370/337 |
| 2001/0024431 A1 * | 9/2001 | Koo et al. .................... 370/335 |

FOREIGN PATENT DOCUMENTS

EP 0 944 275 A2 9/1999

* cited by examiner

Primary Examiner—Steven Nguyen
(74) Attorney, Agent, or Firm—Fleshner & Kim, LLP

(57) ABSTRACT

Disclosed is a method of transmitting/receiving a broadcast message in a mobile communication system enabling to transmit a broadcast message including a video and the like. The present invention proposes an additional broadcast channel so as to transmit a broadcast message such as a video to a mobile station. Moreover, the present invention proposes a method of enabling a mobile station to confirm a summary or channel information so as to demand a broadcast message selectively by previously transmitting information, which is called a data burst summary message or a data burst message by the present invention, about the summary of the broadcast message or a channel through which the broadcast message will be transmitted prior to transmitting the broadcast message having large traffic volume.

17 Claims, 4 Drawing Sheets

METHOD OF TRANSMITTING/RECEIVING BROADCAST MESSAGE IN MOBILE COMMUNICATION SYSTEM

BACKGROUND OF THE INVENTION

1. Field of the Invention

The present invention relates to a mobile communication system, and more particularly, to a method of transmitting/receiving a broadcast message in a mobile communication system enabling to transmit a broadcast message including a video and the like.

2. Background of the Related Art

Generally, a broadcast message transmitting the same message(data burst message) to all the mobile stations may be transmitted through a common channel such as a paging channel(PCH) or a broadcast control channel (BCCH).

FIG. 1 illustrates a diagram of a transferring form of a broadcast message(data burst message) on a paging channel slot according to a related art.

Referring to FIG. 1, a bass station transmits a data burst message to a broadcast address domain. First of all, the base station informs a terminal of information for transmitting the data burst message using a broadcast page record. In this case, the data burst message is a broadcast message transmitted though a paging channel, and a broadcast page is a record in a general page message so as to inform a mobile station that a broadcast message is transmitted to which location of a slot at a slotted mode.

Illustrated in FIG. 1 is a periodic broadcast paging of which number of the broadcast is 3 as an example.

Namely, enabling a periodic broadcast paging channel, the base station informs the transmission of the broadcast message through broadcast pages #1, #2, and #3 on the broadcast paging channel slot.

Specifically, when all of the broadcast messages is able to be transmitted to be sent on one slot, the broadcast message is transmitted on a first slot of a burst paging cycle. When the number of the broadcast message to be sent is one, the broadcast message is transmitted from the first slot of the burst paging cycle.

In other cases, the broadcast pages are put in the general page message to be sent to the first slot of the burst paging cycle, and each slot location of the corresponding broadcast message is determined in accordance with each location of the respective broadcast pages. Namely, the location of the broadcast message corresponding to the broadcast page of which order of location is n is a 3×n slot.

FIG. 2 illustrates a transfer process of a broadcast message using a paging channel according to a related art.

Referring to FIG. 2, in a transmission of a data burst message using the paging channel, a general page message informs the mobile station of the slot in which the data burst message will be transmitted(S10). After a predetermined time, the data burst message is loaded on the corresponding slot in accordance with the transmission slot information so as to be transmitted (S11).

Meanwhile, when a data burst message is transmitted through a broadcast control channel(BCCH), a base station transmits the data burst message through the broadcast control channel. In order to inform the slot in which such a broadcast message is transmitted, the base station firstly transmits the broadcast page through a forward common control channel(F-CCCH).

When the broadcast message is transmitted thorough the broadcast control channel BCCH, the base station transmits the data burst message through the broadcast control channel. In order to inform the slot in which such a broadcast message is transmitted, the base station transmits an enhanced broadcast page through the forward common control channel(F-CCCH).

Correspondingly, a mobile station determines whether to receive the broadcast message using a burst type and a broadcast address of the enhanced broadcast page. A value of the broadcast address is determined by a demand condition of a Standard in connection with the burst type.

The enhanced broadcast page informs a broadcast address type and a broadcast message scheduling information with a record in a general page message or a universal page message.

The enhanced broadcast page is transmitted only once during a broadcast paging cycle. In each broadcast paging cycle, the enhanced broadcast page exists on a first forward common control channel slot. A forward common control channel slot through which the enhanced broadcast page is transmitted is defined as a reference slot. A first transmission of the broadcast message is transmitted on the broadcast control channel slot located behind the reference slot to the extent of 40 ms×(1+TIME_OFFSET). And, a retransmission is transmitted on the broadcast control channel slot located behind the first-transmitted broadcast control channel slot to the extent of 40 ms×(1+REPEAT_TIME_OFFSET).

In FIG. 1, data transmission rates of the paging channel PCH are 4.8 kbps and 9.6 kbps respectively. In case of 4.8 kbps, it is able to transmit 96 bits in one frame of 20 ms. Thus, it is able to transmit 384 bits, i.e. 48 bytes, on a single slot of 80 ms. In case of 9.6 kbps, it is able to transmit 192 bits in one frame of 20 ms. Thus, it is able to transmit 768 bits, i.e. 96 bytes, on a single slot of 80 ms.

Data transmission rates of the broadcast control channel are 4.8 kbps, 9.6 kbps, and 19.2 kbps. In accordance with the respective data transmission rates, the sizes of the slots are different as 160 ms, 80 ms, and 40 ms, respectively. Yet, each amount of data transmitted on a single slot is 744 bits, i.e. 93 bytes.

In case of the present data burst message, a message is transmitted through a traffic channel when a message length msg_len of an IPC header is over 63 bytes(504 bits). Instead, the message is transmitted through a paging channel when the message length msg_len of the IPC header is under 63 bytes(504 bits). The maximum number of characters enabling to be transmitted through the paging channel according to a related art is found by "M=504 bits-98 bits(msg_type, ARQ, Address, SDU)=406 bits=406/8 bytes=50.75 bytes". Considering a padding only, it is able to transmit data of 50 bytes as the maximum number of the characters.

Therefore, it is impossible to a broadcast message such as a video requiring transmitting a data having large traffic volume through the present paging or broadcast control channel. Instead, when a transmission rate of the broadcast message is required higher than a predetermined data rate, the broadcast message may be transmitted through the traffic channel. Unfortunately, the broadcast message has to be transmitted inconveniently to the entire mobile stations respectively so as to use the traffic channel.

SUMMARY OF THE INVENTION

Accordingly, the present invention is directed to a method of transmitting/receiving a broadcast message in a mobile communication system that substantially obviates one or more problems due to limitations and disadvantages of the related art.

An object of the present invention is to provide a method of transmitting/receiving a broadcast message in a mobile communication system enabling to use an additional broadcast channel to transmit a broadcast message when a transmission rate of the broadcast message is required higher than a predetermined data rate.

Another object of the present invention is to provide a method of transmitting/receiving a broadcast message in a mobile communication system using an exclusive channel of a specific mobile station for transmitting a broadcast message.

Additional broadcast advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a broadcast message in a mobile communication system, comprising the steps of transmitting, through a forward common control channel, a slot information with a control information of the broadcast message when a transmission rate of the broadcast message is required higher than a predetermined data rate; transmitting the control information through a broadcast control channel corresponding to the slot information; and transmitting the broadcast message through an additional broadcast channel.

In another aspect of the present invention, a method of transmitting and receiving a broadcast message in a mobile communication system, comprising the steps of transmitting, through a forward common control channel, a slot information with a control information of the broadcast message when a transmission rate of the broadcast message is required higher than a predetermined data rate; transmitting a summary information of the broadcast message through a broadcast control channel corresponding to the slot information; and determining whether to receive the broadcast message or not according to the summary information; demanding to transmit the broadcast message through a reverse common control channel according to the result transmitting the broadcast message through a forward supplemental broadcast channel.

In a further aspect of the present invention, a method of transmitting a broadcast message in a mobile communication system, comprising the steps of: transmitting, through a forward common control channel, a slot information with a control information of a broadcast message when a transmission rate of the broadcast message is required higher than a predetermined data rate; transmitting the control information including a summary information through a broadcast control channel corresponding to the slot information; and transmitting the broadcast message through an additional broadcast channel; determining whether the broadcast message is received or not according to the summary information if the broadcast message is not received through the additional broadcast channel; demanding to transmit the broadcast message through a reverse common control channel according to the result; transmitting the broadcast message through a forward supplemental broadcast channel.

Preferably, the broadcast message is transmitted in a slotted mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The present invention proposes a new channel so as to transmit a broadcast message such as a video to a mobile station.

Moreover, the present invention proposes a method of enabling to transmit broadcast message by transmitting previously information about the summary of the broadcast message or a channel through which the broadcast message will be transmitted prior to transmitting the broadcast message.

Figure 1:
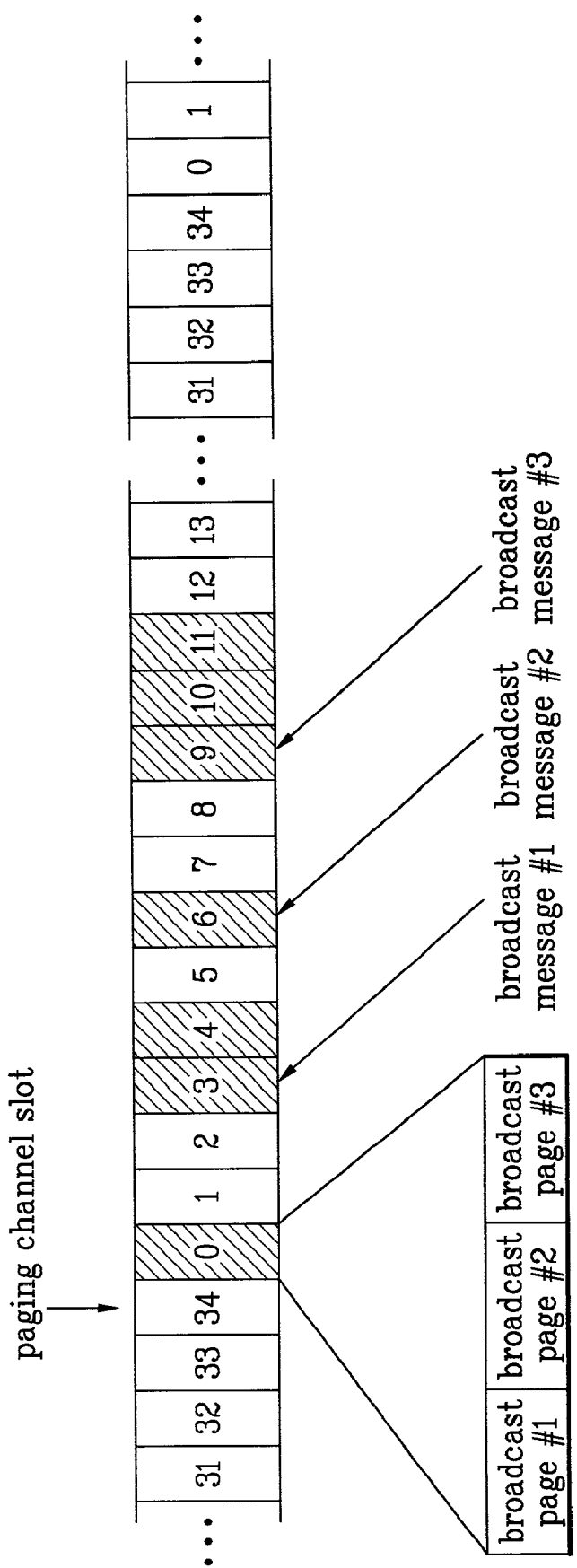
FIG. 1 illustrates a diagram of a transferring form of a broadcasting message(data burst message) on a paging channel slot according to a related art.
Figure 2:
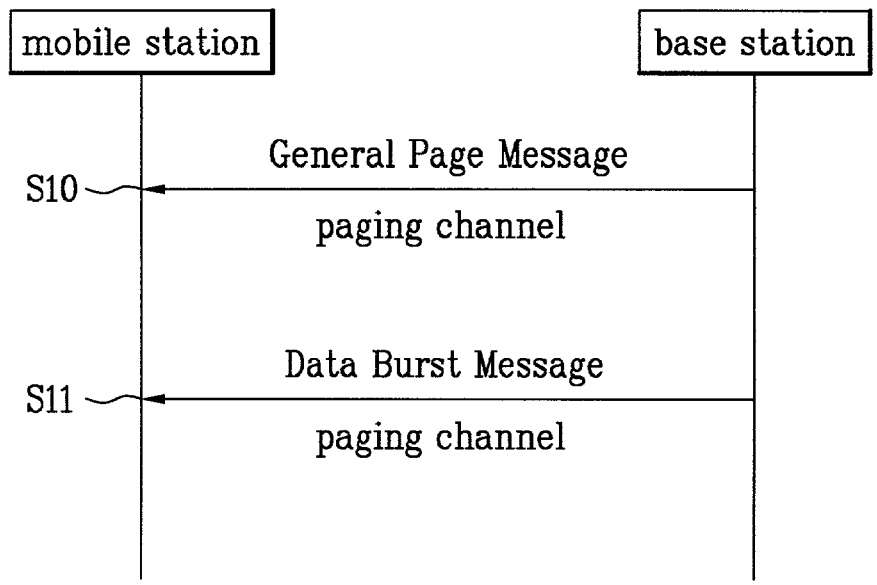
FIG. 2 illustrates a transfer process of a broadcast message using a paging channel according to a related art.
Figure 3:
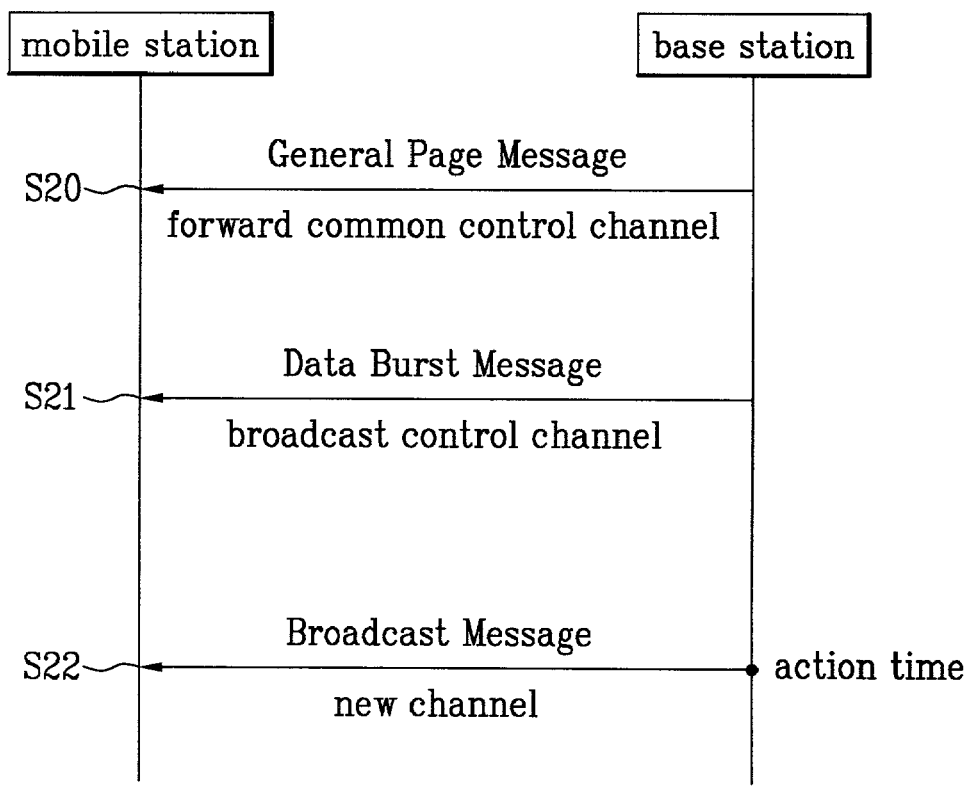
FIG. 3 illustrates a transfer process of a broadcast message using a new channel according to the present invention.

FIG. 3 illustrates a transfer process of a broadcast message using a new channel according to the present invention.

Referring to FIG. 3, a general page message (GPM) transmitted through a forward common control channel (F-CCCH) transmits information firstly about a broadcast control channel (BCCH) through which a data burst message (DBM) is transmitted (S20).

The data burst message(DBM) transmitted through the broadcast control channel(BCCH) transmits information about a new channel transmitting a broadcast message when a transmission rate of the broadcast message is required higher than a predetermined data rate (S21). Transmitted is the information about the new channel, which includes a data transmission rate, a length and a number of Walsh code in connection with the data transmission rate, an action time of the new channel, and the like.

Correspondingly, a mobile station set by the transmitted action time searches the new channel and receives a broadcast message(BCM) transmitted through the new channel (S22).

Figure 4:
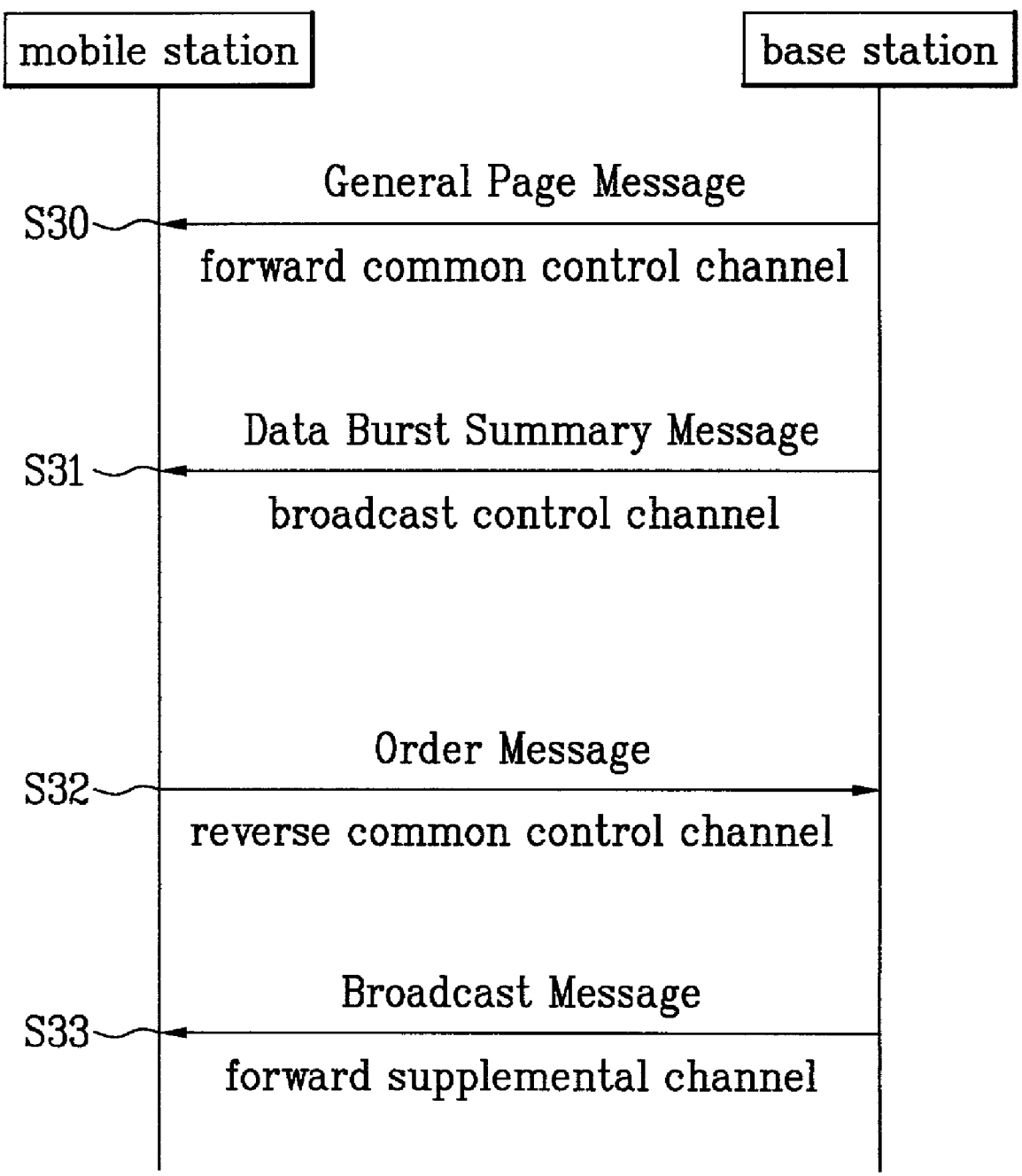
FIG. 4 illustrates an example of a transfer process of a broadcast message using a forward supplemental channel according to the present invention.

FIG. 4 illustrates an example of a transfer process of a broadcast message using a forward supplemental channel according to the present invention.

Referring to FIG. 4, a general page message (GPM) transmitted through a forward common control channel (F-CCCH) transmits information firstly about a broadcast control channel (BCCH) slot on which a data burst message (DBM) is transmitted (S30).

Contents of a summary of the broadcast message are transmitted in the data burst message(DBM) transmitted through the broadcast control channel(BCCH) (S31).

Therefore, a mobile station confirms schematic contents of the data burst summary message. If necessary only, the mobile station demands a transmission of the broadcast message(BCM) corresponding to the data burst message (DBM) through an order message of a reverse common control channel(R-CCCH) (S32)

Correspondingly, a base station receiving the demand of the broadcast message(BCM) of the mobile station transmits the broadcast message(BCM) through a forward supplemental channel(F-SCH) as an exclusive channel of the corresponding mobile station having demanded the broadcast message(S33).

Figure 5:
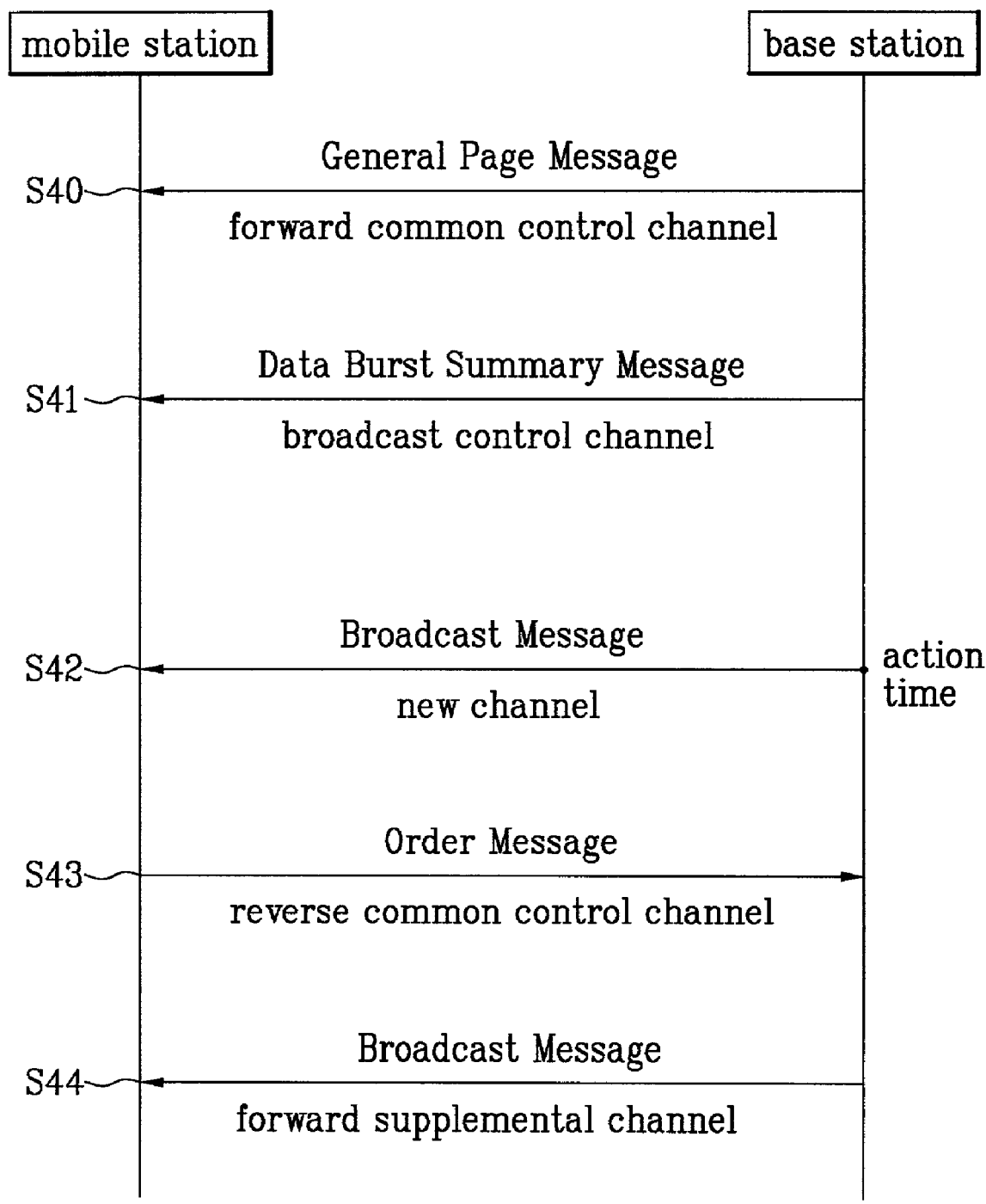
FIG. 5 illustrates another example of a transfer process of a broadcast message using a forward supplemental channel and a new channel according to the present invention.

FIG. 5 illustrates another example of a transfer process of a broadcast message using a forward supplemental channel and a new channel according to the present invention.

Referring to FIG. 5, a general page message(GPM) transmitted through a forward common control channel(F-CCCH) transmits information about a broadcast control channel(BCCH) slot to which a data burst message(DBM) is transmitted(S40).

The contents of a schematic summary of the broadcast message(BCM) and the information about a channel through which this broadcast message(BCM) are transmitted in the data burst message(DBM) transmitted through the broadcast control channel(BCCH) (S41).

The information about the channel through which the broadcast message is transmitted includes a data transmission rate, a length and a number of Walsh code in connection with the data transmission rate, an action time of the channel, and the like.

With the elapse of a predetermined time after the data burst message(DBM) has been transmitted, the base station transmits the broadcast message(BCM) through a new channel(S42).

At this conjuncture, the mobile station confirms the summary of the broadcast message(BCM) transmitted to the data burst message(DBM), determines whether to receive the broadcast message(BCM), and stands by. The mobile station then receives the broadcast message through the new channel.

With the elapse of sufficient time after the data burst message DBM has been sent through the broadcast control channel(BCCH), the broadcast message(BCM) is transmitted. This is for sparing a time for the mobile station to decide.

In case that the mobile station, which fails to decide whether to receive the broadcast message(BCM) until the broadcast message transmitted through the new channel, or any other reason, is unable to receive the broadcast message, the mobile station, if necessary, demands a retransmission of the broadcast message (BCM) to the base station through an order message of a reverse common control channel(R-CCCH) (S43).

After having received such a demand of the broadcast message from the mobile station, the base station transmits a broadcast message through a forward supplemental channel as an exclusive channel of the corresponding mobile station(S44).

As mentioned in the above description, when a new channel is used for transmitting the broadcast message having large traffic volume to the mobile station or the broadcast message having large traffic volume is transmitted through the data-dedicated channel of the mobile station, the present invention enables the mobile station to transmit a broadcast message having large traffic volume by transmitting information about the channel through which the broadcast message will be transmitted or the summary of the broadcast message through the data burst message prior to sending the broadcast message.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of transmitting/receiving a broadcast message in a mobile communication system, comprising:
   transmitting, through a forward common control channel, information about a slot of a broadcast control channel (BCCH) through which the broadcast message is to be transmitted when a required transmission rate of the broadcast message is higher than a predetermined data rate;
   transmitting control information about an additional broadcast channel in the slot of the BCCH; and
   transmitting the broadcast message through the additional broadcast channel when the required transmission rate of the broadcast message is higher than the predetermined data rate.

2. The method of claim 1, wherein the broadcast message is transmitted in a slotted mode.

3. The method of claim 1, wherein the control information includes a data transmission rate of the additional broadcast channel, a length and a number of walsh code in connection with the data transmission rate, and an action time of the additional broadcast channel.

4. The method of claim 1, further comprising retransmitting the broadcast message through the additional broadcast channel according to a retransmission demand of the control information after a predetermined time.

5. A method of transmitting/receiving a broadcast message in a mobile communication system, comprising:
   transmitting, through a forward common control channel, information about a slot of a broadcast control channel (BCCH) through which the broadcast message is to be transmitted when a required transmission rate of the broadcast message is higher than a predetermined data rate;
   transmitting a summary information of the broadcast message in the slot of the BCCH;
   determining whether to receive the broadcast message or not according to the summary information;
   demanding, through a reverse common control channel, the broadcast message be transmitted according to a result of the determining; and
   transmitting the broadcast message through a forward supplemental channel when the required transmission rate of the broadcast message is higher than the predetermined data rate.

6. The method of claim 5, wherein the broadcast message is transmitted in a slotted mode.

7. The method of claim 5, further comprising transmitting the broadcast message through the forward supplemental channel according to a retransmission demand of the control information after a predetermined time.

8. A method of transmitting/receiving a broadcast message in a mobile communication system, comprising:

transmitting, through a forward common control channel, information about a slot of a broadcast control channel (BCCH) through which the broadcast message is to be transmitted when a required transmission rate of the broadcast message is higher than a predetermined data rate;

transmitting control information about an additional broadcast channel in the slot of the BCCH and summary information of the broadcast message;

transmitting the broadcast message through the additional broadcast channel when the required transmission rate of the broadcast message is higher than the predetermined data rate;

determining whether the broadcast message is received or not according to the summary information if the broadcast message is not received through the additional broadcast channel;

demanding through a reverse common control channel, the broadcast message be transmitted according to a result of the determining; and transmitting the broadcast message through a forward supplemental channel when the required transmission rate of the broadcast message is higher than the predetermined data rate in response to the demand.

9. The method of claim 8, wherein the broadcast message is transmitted in a slotted mode.

10. The method of claim 8, wherein the control information includes a data transmission rate of the additional broadcast channel, a length and a number of walsh code in connection with the data transmission rate, and an action time of the additional broadcast channel.

11. A method of receiving a broadcast message in a mobile communication system, comprising:

receiving, through a forward common control channel, information about a slot of a broadcast control channel (BCCH) through which the broadcast message is to be transmitted when a required transmission rate of the broadcast message is higher than a predetermined data rate;

confirming control information about an additional broadcast channel in the slot of the BCCH through the BCCH; and receiving the broadcast message through the additional broadcast channel corresponding to the control information when the regulated transmission rate of the broadcast message is higher than the predetermined data rate.

12. The method of claim 11, wherein the control information includes a data transmission rate of the additional broadcast channel, a length and a number of walsh code in connection with the data transmission rate, and an action time of the additional broadcast channel.

13. The method of claim 11, further comprising receiving the broadcast message through the additional broadcast channel after a predetermined time in accordance to a retransmission demand of the control information.

14. A method of receiving a broadcast message in a mobile communication system, comprising:

receiving, through a forward common control channel, information about a slot of a broadcast control channel (BCCH) through which the broadcast message is to be transmitted when a required transmission rate of the broadcast message is higher than a predetermined data rate;

receiving control information and summary information about an additional broadcast channel in the slot of the BCCH;

determining whether the broadcast message is received or not according to the summary information;

demanding through a reverse common control channel, the broadcast message be transmitted according to a result of the determining; and receiving the broadcast message through a forward supplemental channel when the required transmission rate of the broadcast message is higher than the predetermined data rate.

15. A method of receiving a broadcast message in a mobile communication system, comprising:

receiving, through a forward common control channel, information about a slot of a broadcast control channel (BCCH) through which the broadcast message is to be transmitted when a required transmission rate of the broadcast message is higher than a predetermined data rate;

receiving control information and summary information about an additional broadcast channel in the slot of the BCCH;

determining whether to receive the broadcast message or not through the additional broadcast channel if the broadcast message is not received through the additional broadcast channel;

demanding through a reverse common control channel, the broadcast message be transmitted according to a result of the determining; and receiving the broadcast message through a forward supplemental channel according to the control information when the required transmission rate of the broadcast message is higher than the predetermined data rate.

16. The method of claim 15, wherein the broadcast message is received in a slotted mode.

17. The method of claim 15, wherein the control information includes a data transmission rate of the forward supplemental channel, a length and a number of walsh code in connection with the data transmission rate, and an action time of the forward supplemental channel.

* * * * *